(12) United States Patent
Wang et al.

(10) Patent No.: US 7,852,796 B2
(45) Date of Patent: Dec. 14, 2010

(54) DISTRIBUTED MULTICHANNEL WIRELESS COMMUNICATION

(76) Inventors: Xudong Wang, 11027 NE. 125th La., #W203, Kirkland, WA (US) 98034; Victor Rollinger, 9823 Rimpark Way, San Diego, CA (US) 92124; Abhishek Patil, 10550 Caminito Alvarez, San Diego, CA (US) 92126; Chao Gui, 7879 Avenida Navidad, #271, San Diego, CA (US) 92122; Weilin Wang, 12766 Seabreeze Farms Dr., San Diego, CA (US) 92130; Michael Nova, 6725 Rancho Toyon Pl., Del Mar Mesa, CA (US) 92130

( * ) Notice: Subject to any disclaimer, the term of this patent is extended or adjusted under 35 U.S.C. 154(b) by 556 days.

(21) Appl. No.: 11/420,668

(22) Filed: May 26, 2006

(65) Prior Publication Data

US 2006/0215593 A1    Sep. 28, 2006

Related U.S. Application Data

(63) Continuation-in-part of application No. 11/076,738, filed on Mar. 9, 2005, now abandoned, which is a continuation-in-part of application No. 10/816,481, filed on Apr. 1, 2004, now abandoned, which is a continuation-in-part of application No. 10/437,128, filed on May 13, 2003, now Pat. No. 7,069,483, and a continuation-in-part of application No. 10/437,129, filed on May 13, 2003, now abandoned.

(60) Provisional application No. 60/380,425, filed on May 13, 2002, provisional application No. 60/747,409, filed on May 16, 2006.

(51) Int. Cl.
*H04W 4/00* (2009.01)

(52) U.S. Cl. ........................ 370/314; 370/321; 370/329; 370/337; 370/338; 370/347; 455/450; 455/451; 455/452.1; 455/452.2; 455/550.1; 709/238; 709/239; 709/240; 709/241; 709/242

(58) Field of Classification Search .................. 370/338, 370/351, 389, 392, 412–418, 458, 328, 329, 370/401, 254, 352, 356, 314, 321, 337, 347, 370/431, 442, 443, 315, 390, 445, 448, 462; 455/450.451, 452.1, 452.2, 450, 451; 709/238, 709/239, 240, 241, 242

See application file for complete search history.

(56) References Cited

U.S. PATENT DOCUMENTS 4,706,689 A    11/1987    Man (Continued)

FOREIGN PATENT DOCUMENTS

| WO | 2004104722 | 12/2004 |
|----|------------|---------|
| WO | 2004104850 | 12/2004 |

OTHER PUBLICATIONS

Zhneyu Tang and J.J. Garcia-Luna-Aceves, Hop Reservation Multiple Access (HRMA) for Multichannel Packet Radio Networks, Oct. 12-15, 1998, IEEE Computer Communications and Networks, 1998 Proceedings. &th International Conference on, pp. 388-395.*

(Continued)

*Primary Examiner*—Charles N Appiah
*Assistant Examiner*—Olumide T Ajibade Akonai
(74) *Attorney, Agent, or Firm*—McDonnell Boehnen Hulbert & Berghoff LLP

(57) ABSTRACT

Systems and methods are provided that facilitate distributed multichannel wireless communication and provide the highest level quality of service ("QoS") guarantee and support extremely high bandwidth applications such as voice over internet protocol ("VOIP") streaming audio and video content (including high definition), and multicast applications and also supports convergent networks, ad hoc networks, and the like. A modular MAC architecture provides a group of nodes with the ability to simultaneously communicate with each other using multiple separate communication channels during the same timeslots. The additional throughput gained by employing multiple communication channels is amplified by dynamically mapping the communication channels and timeslots in a network so that multiple channels can be reused simultaneously throughout the network during the same timeslot in a fashion that does not create collisions.

20 Claims, 9 Drawing Sheets

U.S. PATENT DOCUMENTS

| | | | |
|---|---|---|---|
| 5,699,355 A | 12/1997 | Natarajan | |
| 5,844,905 A | 12/1998 | McKay et al. | |
| 5,940,771 A | 8/1999 | Gollnick et al. | |
| 5,943,322 A | 8/1999 | Mayor et al. | |
| 5,959,999 A | 9/1999 | An | |
| 6,003,007 A | 12/1999 | DiRienzo | |
| 6,076,066 A | 6/2000 | DiRienzo | |
| 6,122,516 A | 9/2000 | Thompson et al. | |
| 6,161,104 A | 12/2000 | Stakutis et al. | |
| 6,173,387 B1 | 1/2001 | Baxter et al. | |
| 6,199,115 B1 | 3/2001 | DiRienzo | |
| 6,208,629 B1* | 3/2001 | Jaszewski et al. | 370/329 |
| 6,226,642 B1 | 5/2001 | Beranek et al. | |
| 6,226,684 B1 | 5/2001 | Sung et al. | |
| 6,236,662 B1 | 5/2001 | Reilly | |
| 6,272,492 B1 | 8/2001 | Kay | |
| 6,282,513 B1 | 8/2001 | Strawder | |
| 6,289,316 B1 | 9/2001 | Aghili et al. | |
| 6,292,596 B1 | 9/2001 | Snyder et al. | |
| 6,331,762 B1 | 12/2001 | Bertness | |
| 6,336,114 B1 | 1/2002 | Garrison | |
| 6,338,093 B1 | 1/2002 | DiRienzo | |
| 6,343,310 B1 | 1/2002 | DiRienzo | |
| 6,345,260 B1 | 2/2002 | Cummings, Jr. et al. | |
| 6,349,334 B1 | 2/2002 | Faupel et al. | |
| 6,356,992 B1 | 3/2002 | Baxter et al. | |
| 6,357,010 B1 | 3/2002 | Viets et al. | |
| 6,366,683 B1 | 4/2002 | Langlotz | |
| 6,366,912 B1 | 4/2002 | Wallent et al. | |
| 6,366,929 B1 | 4/2002 | Dartigues et al. | |
| 6,385,730 B2 | 5/2002 | Garrison | |
| 6,414,955 B1* | 7/2002 | Clare et al. | 370/390 |
| 6,418,549 B1 | 7/2002 | Ramchandran et al. | |
| 6,434,191 B1 | 8/2002 | Agrawal et al. | |
| 6,460,128 B1 | 10/2002 | Baxter et al. | |
| 6,480,497 B1* | 11/2002 | Flammer et al. | 370/400 |
| 6,526,534 B1 | 2/2003 | Nagoya | |
| 6,625,605 B1 | 9/2003 | Terakura et al. | |
| 6,628,636 B1* | 9/2003 | Young | 370/337 |
| 6,640,087 B2 | 10/2003 | Reed et al. | |
| 6,665,311 B2* | 12/2003 | Kondylis et al. | 370/462 |
| 6,671,840 B1 | 12/2003 | Nagoya et al. | |
| 6,687,259 B2 | 2/2004 | Alapuranen | |
| 6,694,313 B1 | 2/2004 | Roemer | |
| 6,704,321 B1* | 3/2004 | Kamiya | 370/412 |
| 6,754,188 B1 | 6/2004 | Garahi et al. | |
| 6,760,877 B1 | 7/2004 | Lappetelainen et al. | |
| 6,763,007 B1 | 7/2004 | La Porta et al. | |
| 6,763,013 B2 | 7/2004 | Kennedy | |
| 6,788,702 B1* | 9/2004 | Garcia-Luna-Aceves et al. | 370/458 |
| 6,791,949 B1 | 9/2004 | Ryu et al. | |
| 6,795,418 B2 | 9/2004 | Choi | |
| 6,807,165 B2 | 10/2004 | Belcea | |
| 6,839,541 B2 | 1/2005 | Alzoubi et al. | |
| 6,845,084 B2 | 1/2005 | Rangnekar et al. | |
| 6,850,502 B1 | 2/2005 | Kagan et al. | |
| 6,850,511 B2 | 2/2005 | Kats et al. | |
| 6,853,641 B2 | 2/2005 | Lindhorst-Ko et al. | |
| 6,865,371 B2 | 3/2005 | Salonidis et al. | |
| 6,868,072 B1 | 3/2005 | Lin et al. | |
| 6,870,846 B2 | 3/2005 | Cain | |
| 6,879,570 B1 | 4/2005 | Choi | |
| 6,894,985 B2 | 5/2005 | Billhartz | |
| 6,904,021 B2 | 6/2005 | Belcea | |
| 6,907,257 B1 | 6/2005 | Mizutani et al. | |
| 6,909,721 B2 | 6/2005 | Ekberg et al. | |
| 6,912,215 B1* | 6/2005 | Lin et al. | 370/347 |
| 6,948,048 B2 | 9/2005 | Baxter et al. | |
| 6,950,418 B1* | 9/2005 | Young et al. | 370/337 |
| 6,961,310 B2 | 11/2005 | Cain | |
| 6,965,575 B2 | 11/2005 | Srikrishna et al. | |
| 6,970,714 B2 | 11/2005 | D'Souza et al. | |
| 6,975,613 B1 | 12/2005 | Johansson | |
| 6,975,614 B2 | 12/2005 | Kennedy | |
| 6,980,524 B1 | 12/2005 | Lu et al. | |
| 6,985,476 B1 | 1/2006 | Elliott et al. | |
| 6,986,161 B2 | 1/2006 | Billhartz | |
| 6,993,358 B2 | 1/2006 | Shiotsu et al. | |
| 7,002,944 B2 | 2/2006 | Kats et al. | |
| 7,003,313 B2 | 2/2006 | Garces et al. | |
| 7,007,102 B2 | 2/2006 | Billhartz et al. | |
| 7,016,328 B2 | 3/2006 | Chari et al. | |
| 7,027,426 B2 | 4/2006 | Billhartz | |
| 7,031,293 B1 | 4/2006 | Srikrishna et al. | |
| 7,035,207 B2 | 4/2006 | Winter et al. | |
| 7,046,639 B2 | 5/2006 | Garcia-Luna-Aceves et al. | |
| 7,046,649 B2* | 5/2006 | Awater et al. | 370/338 |
| 7,047,473 B2 | 5/2006 | Hwang et al. | |
| 7,050,806 B2 | 5/2006 | Garces et al. | |
| 7,050,819 B2 | 5/2006 | Schwengler et al. | |
| 7,053,770 B2 | 5/2006 | Ratiu et al. | |
| 7,054,126 B2 | 5/2006 | Strutt et al. | |
| 7,058,021 B2 | 6/2006 | Srikrishna et al. | |
| 7,061,895 B1 | 6/2006 | Habetha | |
| 7,062,286 B2 | 6/2006 | Grivas et al. | |
| 7,069,483 B2 | 6/2006 | Gillies | |
| 7,075,414 B2 | 7/2006 | Giannini et al. | |
| 7,082,111 B2* | 7/2006 | Amouris | 370/321 |
| 7,082,115 B2* | 7/2006 | Bauer et al. | 370/336 |
| 7,091,852 B2 | 8/2006 | Mason et al. | |
| 7,095,732 B1 | 8/2006 | Watson, Jr. | |
| 7,116,983 B2 | 10/2006 | Lan et al. | |
| 7,151,777 B2* | 12/2006 | Sawey | 370/413 |
| 7,233,584 B2 | 6/2007 | Nguyen et al. | |
| 7,245,947 B2 | 7/2007 | Salokannel et al. | |
| 7,251,224 B2* | 7/2007 | Ades et al. | 370/330 |
| 7,269,198 B1 | 9/2007 | Elliott et al. | |
| 7,280,555 B2 | 10/2007 | Stanforth et al. | |
| 7,301,958 B2 | 11/2007 | Borkowski et al. | |
| 7,324,824 B2 | 1/2008 | Smith et al. | |
| 7,376,099 B2* | 5/2008 | Tseng et al. | 370/329 |
| 7,379,447 B2 | 5/2008 | Dunagan et al. | |
| 7,388,849 B2 | 6/2008 | Kim et al. | |
| 7,395,073 B2 | 7/2008 | Gwon et al. | |
| 7,418,523 B2* | 8/2008 | Pettyjohn et al. | 709/250 |
| 7,428,523 B2 | 9/2008 | Tsang et al. | |
| 7,522,537 B2 | 4/2009 | Joshi | |
| 7,609,641 B2 | 10/2009 | Strutt et al. | |
| 2003/0126291 A1 | 7/2003 | Wang et al. | |
| 2003/0142624 A1 | 7/2003 | Chiussi et al. | |
| 2003/0157951 A1* | 8/2003 | Hasty, Jr. | 455/519 |
| 2003/0179742 A1* | 9/2003 | Ogier et al. | 370/351 |
| 2003/0193908 A1 | 10/2003 | Cain | |
| 2003/0212821 A1 | 11/2003 | Gillies | |
| 2003/0212941 A1 | 11/2003 | Gillies et al. | |
| 2003/0224787 A1 | 12/2003 | Gandolfo | |
| 2004/0109428 A1 | 6/2004 | Krishnamurthy | |
| 2004/0147223 A1 | 7/2004 | Cho | |
| 2004/0152416 A1 | 8/2004 | Dahl | |
| 2004/0198375 A1 | 10/2004 | Schwengler et al. | |
| 2005/0002366 A1* | 1/2005 | Toskala et al. | 370/338 |
| 2005/0026621 A1 | 2/2005 | Febvre et al. | |
| 2005/0083971 A1 | 4/2005 | Delaney et al. | |
| 2005/0090266 A1 | 4/2005 | Sheynblat | |
| 2005/0111475 A1 | 5/2005 | Borkowski et al. | |
| 2005/0141453 A1* | 6/2005 | Zhu | 370/331 |
| 2005/0190770 A1 | 9/2005 | Saniee et al. | |
| 2005/0201315 A1 | 9/2005 | Lakkis | |

| | | |
|---|---|---|
| 2005/0201340 A1 | 9/2005 | Wang et al. |
| 2005/0221752 A1 | 10/2005 | Jamieson et al. |
| 2005/0232179 A1 | 10/2005 | daCosta et al. |
| 2006/0104205 A1 | 5/2006 | Strutt et al. |
| 2006/0104292 A1* | 5/2006 | Gupta et al. ............... 370/401 |
| 2006/0128402 A1 | 6/2006 | Lee et al. |
| 2006/0182142 A1* | 8/2006 | Schmidt .................... 370/465 |
| 2006/0215583 A1 | 9/2006 | Castagnoli |
| 2006/0240843 A1 | 10/2006 | Spain et al. |
| 2006/0253747 A1 | 11/2006 | Gillies |
| 2006/0268908 A1 | 11/2006 | Wang |
| 2007/0049342 A1 | 3/2007 | Mayer et al. |
| 2007/0076673 A1 | 4/2007 | Joshi |
| 2007/0076697 A1 | 4/2007 | Huotari et al. |
| 2007/0104215 A1 | 5/2007 | Wang |
| 2007/0159991 A1 | 7/2007 | Noonan et al. |
| 2007/0201421 A1 | 8/2007 | Huseth |
| 2007/0211682 A1 | 9/2007 | Kim et al. |
| 2007/0247367 A1 | 10/2007 | Anjum et al. |
| 2007/0247368 A1 | 10/2007 | Wu |
| 2007/0294226 A1 | 12/2007 | Chahal et al. |
| 2008/0031169 A1 | 2/2008 | Shi |
| 2008/0032705 A1 | 2/2008 | Patel |
| 2008/0037723 A1 | 2/2008 | Milstein et al. |
| 2008/0069071 A1 | 3/2008 | Tang |
| 2008/0080378 A1 | 4/2008 | Kim et al. |
| 2008/0192713 A1 | 8/2008 | Mighani et al. |
| 2008/0259895 A1 | 10/2008 | Habetha et al. |
| 2009/0073924 A1 | 3/2009 | Chou |

OTHER PUBLICATIONS

Zhenyu Tang and J.J. Garcia-Luna-Aceves, A Protocol for Topology-Dependent Transmission Scheduling in Wireless Networks, Sep. 1999, in Proceedings, IEEE Wireless Communication and Networking Conference 1999 (WCNC '99), pp. 1333-1337.*

Lichun Bao and J.J. Garcia-Luna-Aceves, Collision-Free Topology-Dependent Channel Access Scheduling, Oct. 22, 2000-Oct. 25, 2000, MILCOM 2000. 21st Century Military Communication Conference Proceedings, vol. 1, pp. 507-511.*

Lichun Bao and J.J. Garcia-Luna-Aceves, Distributed dynamic access scheduling for ad hoc networks, Journal of Parallel and Distributed Computing, Apr. 13, 2003 Elsevier Science, vol. 63, Issue 1, pp. 3-14.*

Jian Tang, Guoliang Xue and Weiyi Zhang, Interference-Aware Topology Control and QoS Routing in Multi-Channel Wireless Mesh Networks, 2005, International Symposium on mobile Ad Hoc Networking and Computing. Proceedings of the 6th ACM international symposium on Mobile ad hoc networking and computing, pp. 68-77.*

US Receiving Office, International Search Report, International Application No. PCT/US07/69031, Jan. 22, 2008.

US Receiving Office, Written Opinion, International Application No. PCT/US07/69031, Jan. 22, 2008.

* cited by examiner

DISTRIBUTED MULTICHANNEL WIRELESS COMMUNICATION

RELATED APPLICATION

The present application claims the benefit of provisional application No. 60/747,409 filed May 16, 2006, and is a continuation-in-part of U.S. patent application Ser. No. 11/076,738 filed on Mar. 9, 2005, now abandoned which is a continuation-in-part of U.S. patent application Ser. No. 10/816,481 filed on Apr. 1, 2004, now abandoned which is a continuation-in-part of U.S. patent application Ser. No. 10/437,128 now U.S. Pat. No. 7,069,483 and Ser. No. 10/437,129 filed on May 13, 2003 now abandoned that each claim the benefit of provisional application 60/380,425 filed on May 13, 2002, all of which are incorporated herein by reference in their entirety.

BACKGROUND

1. Field of the Invention

The present invention generally relates to wireless communications and more specifically relates to a software implemented media access control ("MAC") layer and implementation of distributed multichannel wireless communication over a wireless network medium.

2. Related Art

Time division multiple access ("TDMA") is a digital transmission technology that allows a number of users to access a single radio-frequency ("RF") channel without interference by allocating unique timeslots to each user within each channel. To implement TDMA in a wireless communication network, a centralized controller is required that broadcasts a timing beacon for wireless devices to synchronize with and assigns timeslots to the various wireless devices in the network. The centralized controller requirement for conventional TDMA is a drawback of TDMA for next generation wireless communications.

TDMA additionally suffers from wasted bandwidth. In some TDMA systems such as the global system for mobile communications ("GSM"), the central controller assigns each wireless device one or more timeslots for transmission and if a particular device has no pending data to transmit, the timeslot will go unused. In aggregate, unused slots can be very burdensome on a TDMA communication system, in particular a communication system adapted for data communications.

In some TDMA systems such as the general packet radio service ("GPRS") or the third generation of mobile phone technologies covered by the ITU IMT-2000 family ("3G") cellular networks, dynamic timeslot allocation is allowed. However, this has to be performed by a central controller, e.g., base station. In order to send the dynamic information, e.g., queue length, traffic load, etc., of network nodes to the central controller, frequent message exchange is needed between network nodes and the central controller, which causes a high signaling overhead.

Additionally, for wireless communications based on IEEE 802.11, 802.15, 802.16, ultra wide band ("UWB") and other wireless technologies, scalability and quality of service ("QoS") are two critical concerns. One significant problem is that the conventional 802.11 MAC is not scalable because the throughput dramatically drops as the number of hops increases and/or as the number of nodes increases. This lack of throughput causes an unacceptable QoS level. Some improvements have been identified such as 802.11e, but even this proposal suffers because it is dependent on the carrier sense multiple access/collision avoidance ("CSMA/CA") protocol that does not guarantee any level of traffic flow (i.e., throughput) for single or multihop networks.

For example, enhanced distributed channel access ("EDCA") only enforces traffic prioritization of different flows on the same node or client. It does not provide prioritization between flows on different nodes or clients. Additionally, while the hybrid coordination function ("HCF") allows the allocation of a collision free period ("CFP") the CFP cannot coexist with a collision period ("CP") because retransmission of packets at the end of the CP will encroach on the CFP and thus cause interference between the CP and CFP periods. The same problem exists when retransmitted packets of CFP fall into the CP. Furthermore, IEEE 802.11e does not have a method to ensure that HCFs of different nodes in a wireless network do not overlap. Accordingly, overlapping HCFs result in collisions and severely limited QoS. Excellent QoS is extremely important for QoS sensitive applications such as voice over internet protocol ("VOIP"), streaming video, and other high bandwidth applications that require high fidelity.

Finally, using alternative techniques such as frequency division multiple access ("FDMA") or code division multiple access ("CDMA") as a basis for the wireless communication fails on 802.11 because such techniques require a non 802.11 physical layer. Therefore, these and other significant problems found in the conventional systems have created a need in the industry for a system and method that provides efficient high bandwidth communication over a wireless network medium and overcomes these significant problems found in the conventional systems as described above.

SUMMARY

Accordingly, the problems found in the conventional systems are overcome by the systems and methods described herein that combine the advantages of both TDMA and multichannel operation. The system operates in a distributed fashion and therefore does not require a centralized operation. Additionally, the system provides a MAC that is compatible with commercially available IEEE 802.11 chipsets, which makes it more economical to provide and maintain compatibility with evolving standards.

The system employs a TDMA based MAC protocol implemented in software that uses multiple channels that are available in the IEEE 802.11 (and other wireless protocols such as UWB) frequency bands. The system operations are distributed amongst the nodes in a wireless network so that the system can maintain communications as nodes travel in and out of local networks. Advantageously, the combined advantages of multichannel and TDMA communication resolve the scalability issues found in the conventional systems. The TDMA based MAC protocol may also be implemented in hardware or a combination of hardware and software.

Furthermore, systems and methods are provided to allow for distributed multichannel wireless communication that provides the highest level quality of service ("QoS") guarantee and supports extremely high bandwidth applications such as VoIP, streaming audio and video content (including high definition), multicast applications, and also supports convergent networks, ad hoc networks, and the like. This is achieved by a modular MAC architecture that provides a cluster of nodes or clients with the ability to simultaneously communicate with each other using separate communication channels during the same timeslots. This additional throughput capability is amplified by dynamically mapping communication channels and timeslots in a network so that multiple channels can be reused simultaneously throughout the network during the same timeslot in a fashion that does not create collisions.

For example, a node or client first determines the network topology of its wireless communication network in order to identifying its neighboring nodes or clients and the discrete link the node or client has with each of its neighbors. Timeslots for transmission of packets between the node and its neighbors are then identified and a separate channel is assigned for communication between the node and each neighbor. The various timeslots and communication channels are dynamically mapped across the network to maximize throughput and then queued up packets are transmitted over the various channels during the various timeslots in accordance with the dynamically changing mapping. The dynamically changing mapping allows maximum flexibility for spikes in throughput by individual nodes and also accounts for efficient ingress and egress of nodes in the wireless network. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments disclosed herein provide for systems and methods for distributed TDMA communication between nodes of a wireless communication network. For example, one system as disclosed herein provides an enhanced MAC layer on a network device that is configured to identify its neighboring nodes and create a mapping of communication channels and timeslots for multichannel TDMA communication between the network device and its neighbors.

After reading this description it will become apparent to one skilled in the art how to implement the invention in various alternative embodiments and alternative applications. To facilitate a direct explanation of the invention, the present description will focus on an embodiment where communication is carried out over an IEEE 802.11 network, although the invention may be applied in alternative networks including 802.15, 802.16, worldwide interoperability for microwave access ("WiMAX") network, wireless fidelity ("WiFi") network, wireless cellular network (e.g., wireless wide area network ("WAN"), UWB network, ZigBee, and/or any other wireless communication network topology or protocol. Additionally, the described embodiment will also focus on a single radio embodiment although multi-radio embodiments and other multiple input multiple output ("MIMO") embodiments are certainly contemplated by the broad scope of the present invention. Therefore, it should be understood that the single radio, 802.11 network embodiment described herein is presented by way of example only, and not limitation. As such, this detailed description should not be construed to limit the scope or breadth of the present invention as set forth in the appended claims.

Figure 1:
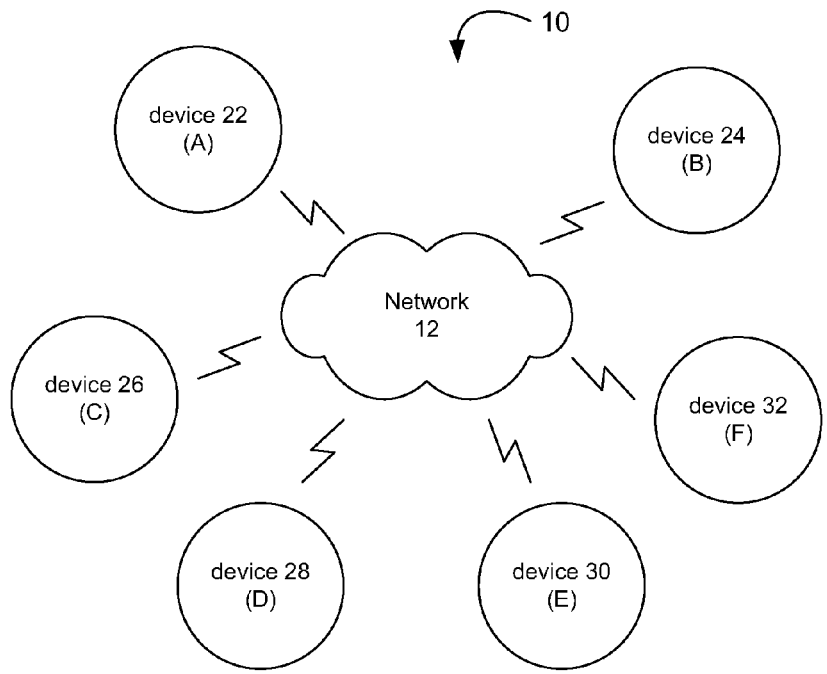
FIG. 1 is a network diagram illustrating an example wireless communication network according to an embodiment of the present invention.

FIG. 1 is a network diagram illustrating an example wireless communication network 10 according to an embodiment of the present invention. In the illustrated embodiment, the wireless network 10 comprises a plurality of devices including device 22, device 24, device 26, device 28, device 30, and device 32. Each of these devices has also been provided with an alphabetical label (A-F, respectively) to be used in the context of a later discussion.

Each of the wireless communication devices 22-32 can be any of a variety of wireless communication devices, including a cell phone, personal digital assistant ("PDA"), personal computer ("PC"), laptop computer, PC card, special purpose equipment, access point, router, switch, radio frequency identification ("RFID") reader, base station controller, WiFi phone, security camera, set top box, or any combination of these and other devices capable of establishing a wireless communication link over the network 10. Throughout this detailed description a wireless communication device such as those shown in FIG. 1 may be referred to as a wireless device, device, wireless node, node, wireless client, client, mesh client, mesh node, or the like.

In the illustrated embodiment, the network 10 is a wireless mesh network, but as described above, the network 10 could be any of a variety of network types and topologies and employ any of a variety of types of protocols. For the sake of providing a straightforward description, the illustrated embodiment will be described as an IEEE 802.11 network 10 that is a wireless mesh network and has a cluster topology.

Figure 2:
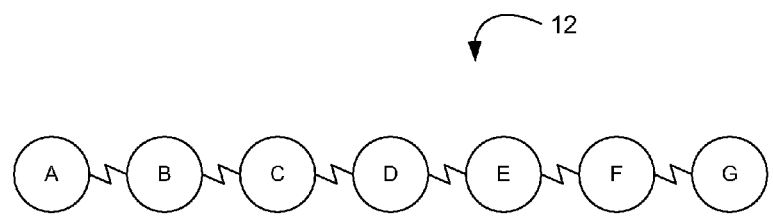
FIG. 2 is a network diagram illustrating an example wireless communication network according to an embodiment of the present invention.

As will be understood by those having skill in the art, alternative topologies may also be present as a wireless mesh network shifts over time with ingress and egress of the various client devices. Accordingly, FIG. 2 is a network diagram illustrating an example wireless communication network 12 according to an embodiment of the present invention. In the illustrated embodiment, the wireless network 12 comprises wireless nodes A-F and has a linear topology. For example, terminal node A is within communication range of node B, node B is in communication range of nodes A and C, and so on through terminal node G that is in communication range of node F. The linear topology shown in the embodiment of FIG. 2 will be used in the context of a later discussion. In summary of FIGS. 1 and 2, although only the cluster and linear topologies are illustrated, various additional wireless network topologies can also be present in a network as will be understood by those having skill in the art.

Figure 3:
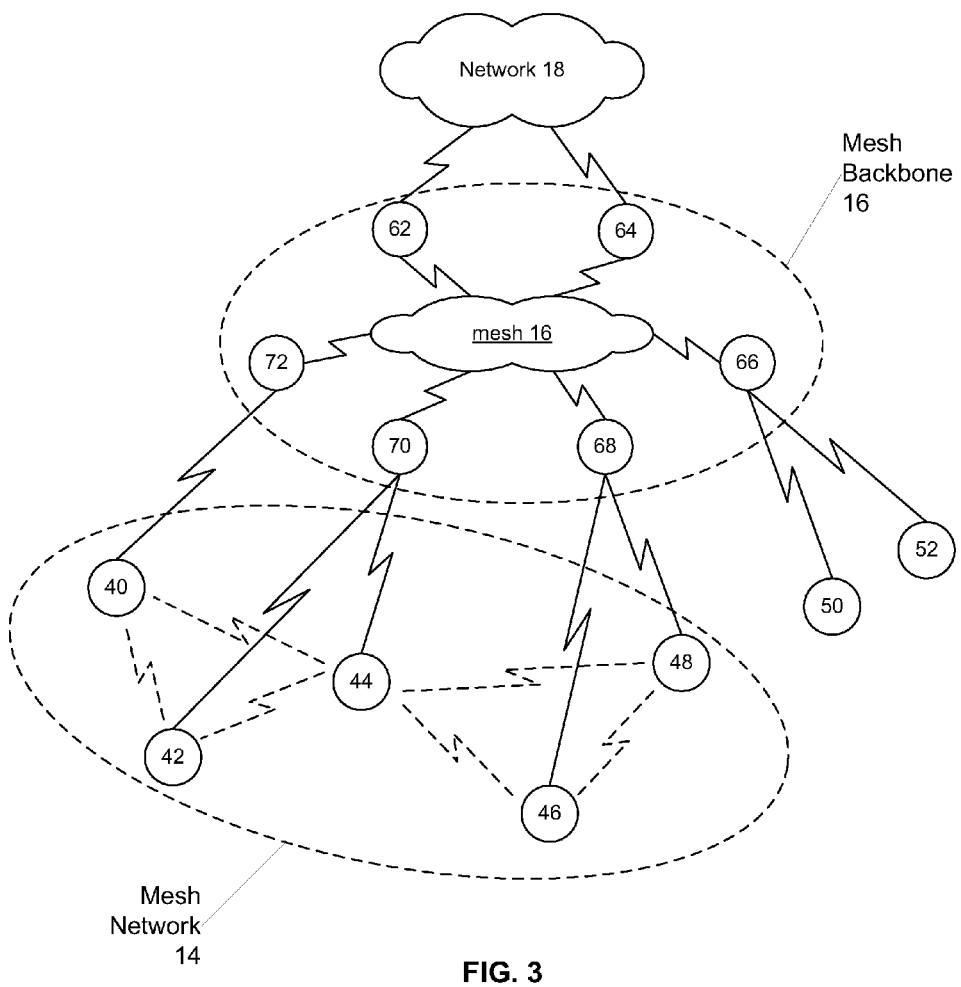
FIG. 3 is a network diagram illustrating an example wireless communication network according to an embodiment of the present invention.

For example, FIG. 3 is a network diagram illustrating an example wireless communication network 18 according to an embodiment of the present invention. In the illustrated embodiment, the network 18 comprises a mesh network 14 and two nodes 50 and 52 that are communicatively coupled to each other and also to other portions of network 18 via a wireless mesh network backbone 16.

The mesh backbone 16 comprises a plurality of router, gateway, and bridge devices including device 62, device 64, device 66, device 68, device 70, and device 72. These devices cooperatively communication with each other and various nodes to provide a dynamic wireless communication network that enables each node to communicate directly or indirectly with each other and also with the network 18.

For example, nodes 40, 42, 44, 46, and 48 are in mesh network 14 and can communicate directly with each other. Additionally, these nodes can communicate with nodes 50 and 52 through the mesh backbone 16. In one embodiment, node 40 communicates with node 50 via the router devices 72 and 66. Furthermore, if node 50 were to move into proximity with node 48, for example, then node 50 may join mesh network 14, after which communications between node 40 and node 50 may travel along the multi-hop path including nodes 44 and 48.

The network 18 may comprise any of a variety of network types and topologies and any combination of such types and topologies. For example, the network 18 may comprise a plurality of networks including private, public, circuit switched, packet switched, personal area networks ("PAN"), local area networks ("LAN"), wide area networks ("WAN"), metropolitan area networks ("MAN"), satellite network, roaming networks, or any combination of the these. Network 18 may also include that particular combination of networks ubiquitously known as the Internet.

Figure 4:
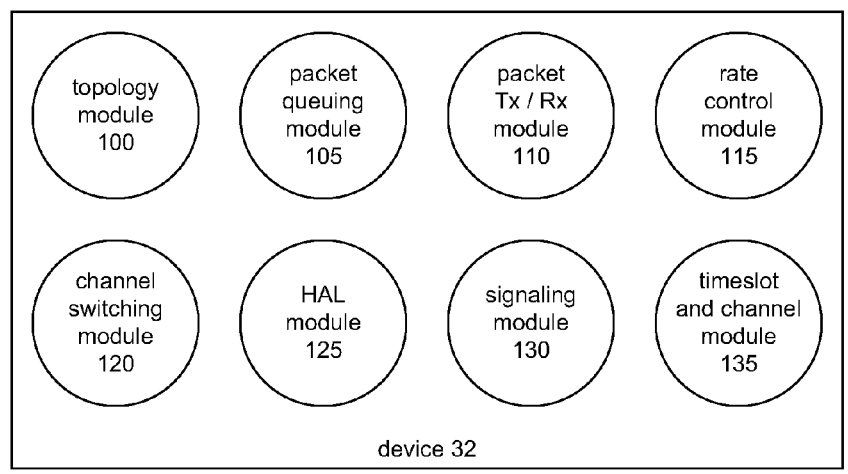
FIG. 4 is a block diagram illustrating an example wireless communication device for distributed multichannel communication according to an embodiment of the present invention.

FIG. 4 is a block diagram illustrating an example wireless communication device 32 for distributed multichannel TDMA communication according to an embodiment of the present invention. In the illustrated embodiment, the node 32 comprises a topology module 100, a packet queuing module 105, a packet transmit ("Tx") and receive ("Rx") module 110, a transmission rate control module 115, a channel switching module 120, a hardware abstraction layer ("HAL") module 125, a signaling module 130, and a timeslot and channel allocation module 135. Additionally, in the illustrated embodiment the node 32 implements distributed multichannel TDMA communication in the MAC layer, thus providing the node 32 with a distributed multichannel TDMA MAC ("DMT-MAC").

The topology module 100 is configured to interrogate the surroundings of the node and communicate with other nodes that are discovered to determine the topology of the wireless network that the node is part of. For example, a node may only find a single device and learn from that device that other nodes are present in the network in accordance with a linear topology, such as the topology illustrated in FIG. 2. Alternatively, the node may find multiple devices in communication range and learn from those devices that together they all form a wireless mesh network cluster, such as the topology illustrated in FIG. 1.

The packet queuing module 105 is configured to receive packets from a higher layer in the communication stack and buffer those packets for later transmission over the physical medium. In one embodiment, when a packet is received from a higher layer such as the logical link control ("LLC") layer, its header is checked to determine the type of the packet. In one embodiment, the packet queuing module 105 recognizes certain packet types including: (1) unicast packets; and (2) broadcast packets. The different types of packets are processed differently before they are buffered in a transmission queue. For example, the processing may include operations such as configuration of transmit power level, security encryption, and many HAL related configurations.

In one embodiment, broadcast packets are buffered in a single broadcast queue, while unicast packets are buffered in different queues as determined by the destination MAC header and whether a channel has been assigned for communication with the destination node. For example, if no channel has been assigned for communication with the destination node, the packet can be buffered in a special slot queue for later transmission on a common channel. In one embodiment, if a node has N neighbors, the number of transmission queues is N+2, which accounts for one broadcast queue, one special slot queue, and N neighbor queues. Since each neighbor has a queue, the special slot queue may be used for new nodes that join the network and do not yet have an assigned communication channel.

Accordingly, in one embodiment an node may have three different types of packet buffer queues, including (1) a broadcast queue used for all broadcast packets, where packet transmission from the broadcast queue only occurs in the broadcast timeslot on a common channel; (2) a special slot data queue used for unicast packets when a timeslot or channel has not assigned to a destination node, where packet transmission from the special slot queue only occurs in special timeslot on a common channel; and (3) a regular data queue used for sending unicast packets to destination nodes, where packet transmission from a regular data queue occurs during a regular data timeslot on an assigned channel. Advantageously, each queue corresponds to a particular link from one node to another. In addition, among all neighbor nodes, each timeslot allows one queue to send packets on a certain channel.

In an alternative embodiment, the special slot queue can be eliminated by creating a new regular data queue to buffer packets destined for any node that does not yet have an assigned channel for communication, although transmission of those packets would take place after a channel and timeslot were allocated for communication with that destination node.

The packet Tx/Rx module 110 is configured to send and receive packets. Packets are sent from the various transmission queues and received packets are validated and then passed along to a higher layer. Because there is typically more than one transmission queue, the queue from which packets are transmitted is determined by transmission queue selection. The transmission queue is selected according to (timeslot→queue) mapping, as assigned by a timeslot and channel allocation algorithm. Once a transmission queue is selected, the packet Tx/Rx module 110 causes the packets in this queue to be sent to the destination node over a predetermined channel identified for communication with the particular destination node. The predetermined channel is also assigned by the timeslot and channel allocation algorithm and given in the (timeslot→channel) mapping. Accordingly, the packet Tx/Rx module 110 sends packets in accordance with the (timeslot→(queue, channel)) mapping.

In one embodiment, for a given timeslot, when a transmission queue is selected and the channel is determined, packets in this queue are sent using the determined channel. Packet transmission actually occurs in the HAL and physical layer hardware, however, the transmission status is provided back to the packet Tx/Rx module 110. The transmission status is used by packet Tx/Rx module 110 to manage software retransmission and facilitate transmission rate control in cooperation with the rate control module 115.

Software retransmission allows the DMT-MAC to control retransmission of packets. Thus, when a packet is sent successfully, as acknowledged by the HAL, the packet Tx/Rx module 110 removes the packet from the queue and starts to send the next packet. If the packet is not sent successfully, the packet is sent again by the packet Tx/Rx module 110. To implement robust software retransmission, the packet Tx/Rx module 110 tracks the number of transmissions so that if a packet cannot be successfully delivered before the number of retries reaches zero, the packet is removed from the queue, and the next packet is sent. As will be understood by those skilled in the art, removal of a packet from the transmission queue causes packet loss due to exhaustion of retransmission. This typically occurs when the channel quality is poor.

In one embodiment, to facilitate software retransmission, the standard IEEE 802.11 hardware retransmission is disabled by the packet Tx/Rx module 110 so that the DMT-MAC itself solely manages retransmission of packets. Implementation of software retransmission provides the following advantages: (1) timeslot boundaries are not crossed by retransmitted packets; (2) the packet Tx/Rx module 110 is aware of when to send the next new packet.

In one implementation of software retransmission, the default retransmission by the HAL is disabled and the HAL is configured to acknowledge when a packet is successfully sent and the number of retries in the HAL registers is set to one. With these configurations, the HAL transmission status registers can advantageously be read by the packet Tx/Rx module 110 to determine when packet transmission is successful. One significant advantage of software retransmission is that TDMA retransmission relies upon the acknowledgment ("ACK") mechanism of 802.11 MAC and therefore there is no need to develop a separate SEND/ACK procedure for software retransmission.

An additional advantage of software retransmission is that the transmission and retransmission statistics are collected by the packet Tx/Rx module 110 and used by the rate control module 115 to facilitate selection of an appropriate transmission rate for new packets.

In one embodiment, for new packet transmissions there are three scenarios that initial the process new packet transmission: (1) a new packet arrives from a higher layer (e.g., LLC layer); (2) channel switching is complete and a new packet transmission is initiated; and (3) the transmission of the current packet is successfully completed and the current timeslot still belongs to the selected queue.

Notably, channel switching disables the transmit interrupt and as a result, when a new timeslot arrives there may be no event that can trigger packet transmission. Although a new arrival packet may trigger new packet transmission in the new timeslot, this is not always the case, which results in low utilization of a timeslot and low throughput. Accordingly, the packet Tx/Rx module 110 starts a new packet transmission when channel switching is done. The queue that is selected for new packet transmission is determined based on the current timeslot and the (timeslot→queue) mapping.

In the case where a transmit interrupt is received, the packet Tx/Rx module 110 identifies which queue the interrupt belongs to. Once the queue is identified the packet Tx/Rx module 110 begins retransmission of a packet or a new packet transmission. In one embodiment, identification of the transmission queue is achieved by indexing each packet transmission with a packet type and its destination MAC address. For example, when a packet in a unicast queue (e.g., queue N) is sent to a target node, the packet Tx/Rx module 110 maintains two variables for the queue: (1) the queue type; and (2) the MAC address of the target node. When this packet is sent by the HAL and a Tx interrupt is received by the packet Tx/Rx module 110, the two variables help to identify queue N so that transmission of a new packet from queue N or retransmission can be started immediately.

It should be noted that a MAC address alone is insufficient to uniquely identify a transmission queue because, for example, the special slot data queue and a regular data queue can have the same destination MAC address.

The packet Tx/Rx module 110 also performs packet receiving, which is much simpler than packet transmission. For example, given a particular node, as long as a channel is selected according to the (timeslot→channel) mapping, any packets with this node as the destination will be received. When a packet is received, it will be processed according to its packet type. For example if the packet is a beacon, then conventional beacon related operation as specified in IEEE 802.11 MAC is executed. Additionally, DMT-MAC specific network topology information may also be sent in a beacon packet.

Alternatively, if a received packet is a DMT-MAC signaling packet, it is processed by the timeslot and channel allocation module 135. If the received packet is a MAC layer control or management packet such as probe-request and probe-response, the corresponding function in standard IEEE 802.11 MAC is executed. If the received packet is a regular data packet, it is processed by checking its integrity and if the packet is valid, it is sent to a higher layer further processing.

The transmission rate control module 115 is configured to maintain an appropriate transmission rate for packets sent to each destination node. In one embodiment, the rate control module 115 determines the transmission rate of each packet based on the historical transmission status of previous packets. Rate control is performed separately for each destination, since the link qualities to different destinations may be different. A variety of rate control schemes may be used by the rate control module 115 to determine the optimal transmission rate.

In multichannel operation, there can be more than one rate control process, for example because different channels may be used to the same destination from time to time. Additionally channel characteristics across different channels can vary widely. Thus, when a channel is changed, even if the destination is still the same a different rate control is advantageously invoked to determine the transmission rate of the next packet.

Furthermore, because transmission rate control is dependent on the historical transmission status to determine the transmission rate of the next packet, the rate control module 115 is configured to collect such information. For example, the rate control module 115 collects combined information from both the HAL and software retransmission as transmission status information. Advantageously, feedback from the HAL tells whether or not a packet is sent successfully, while feedback from software retransmission gives information about how many retries were sent until packet transmission was successful.

The channel switching module 120 is configured to quickly change between available 802.11 channels so that multichannel communications can be efficiently carried out. In one embodiment, at the beginning of each timeslot, the channel switching module 120 determines if channel switching is needed. If the channel for the new timeslot is the same as the previous timeslot, channel switching is not needed. However, in order to keep synchronization among all nodes, a certain amount of delay can be employed before new packet transmission starts.

If the channel for the new timeslot is not the same channel, channel switching is needed. Accordingly, to switch to a new channel, the channel switching module 120 first backs up all of the HAL registers that are needed for TDMA operation. Next, the channel switching module 120 disables all hardware interrupts. The hardware is then reset to the new channel, the hardware interrupts are re-enabled, the registers in the hardware are reconfigured and the HAL registers are restored for continued TDMA operation. Then the new packet transmission starts.

Advantageously, certain efficiencies can be employed to speed up channel switching. For example, because channel switching is only geared to switch to another channel, many hardware registers do not need to be reset and reconfigured for the new channel. Thus, only selected registers that are closely related to a physical channel needs are reset and reconfigured. By doing this partial hardware reset, the overall channel switching time spent on the hardware reset can be significantly reduced.

Additionally, before switching channels both the receiving and transmitting hardware must be clear of outstanding packets to avoid packet loss and allow a proper hardware cannot. In order to avoid such errors, a guard time is provided before channel switching, which is implemented by determining whether a packet transmission will cross the boundary of a timeslot. Due to variable transmission rates, the guard times advantageously also vary as the transmission rate changes.

Furthermore, channel switching by different nodes may not take exactly the same amount of time. Thus, when channel switching is completed at a first node, a second node may be still in the process of channel switching. This may occur even if channel switching at all nodes begins at the same time. Such different channel switching times can cause problems when a new packet transmission is initiated after channel switching. For example, a packet may be lost or hardware errors can happen. Accordingly, a guard time is provided to compensate for the different channel switching times among different nodes. Advantageously, the length of the guard time is variable so that the delay from the start of a timeslot to the initiation of a new packet transmission is fixed and the same for all nodes.

The HAL module 125 is configured to manage the HAL in accordance with the needs of the DMT-MAC. For example, the HAL module 125 is configured to disable retransmission in the HAL. In one embodiment, certain operational parameters for the DMT-MAC are provided in the initialization function of the DMT-MAC to allow the HAL module 125 to modify or disable the functions of the HAL. For example, certain hardware registers in the HAL are set by the HAL module 125 to provide real-time interrupts or events that mark the start of each timeslot and each TDMA frame. Additionally, the HAL module 125 may configure the HAL to send beacons in a common channel in a common slot for all nodes in order to avoid network partition when in multichannel operation. Furthermore, the HAL configuration can be optimized by the HAL module 125 so that channel switching is also optimized.

The signaling module 130 is configured to send and receive signaling messages needed by the DMT-MAC to implement distributed multichannel TDMA communications. In one embodiment, the signaling module 130 uses both beacon-based signaling and explicit signaling. Beacon-based signaling is accomplished by adding extra information into a beacon and signaling is carried out by the standard procedure of beacon transmission and receiving. Although this method is simple and does not impact the regular operation of beaconing, signaling based on beaconing has several disadvantages.

For example, beacon-based signaling messages are sent without any guarantees of being successfully received, since a beacon is sent as a broadcast packet. Additionally, a beacon-based signaling message may take long time to receive its destination. This is in part because under the procedures of beaconing, whenever a node successfully sends out a beacon, all neighboring nodes will not send beacons until the next beacon interval. Thus, if there are N nodes in a neighborhood, the average chance of sending out a beacon is 1/N per node per beacon interval. Thus, if a node has information to send, it may not be able to send that information for a long time which makes information relay by beacons very slow, especially in a cluster mesh or other multi-hop topology.

Due to such disadvantages, beacon-based signaling is advantageously used for non-time-critical signaling message. For example, the information about network topology and network degree can be sent via beacon-based signaling.

Explicit signaling, on the other hand, provides signaling messages between nodes by explicitly sending signaling packets. In one embodiment a plurality of packet types are defined for MAC signaling. For example, each of these packet types can be identified by a signaling message identifier and perhaps other identification information to indicate that they are for signaling purposes only.

In one embodiment, explicit signaling is accomplished by guaranteed unicast transmission in a signaling timeslot. Advantageously, because the transmission is unicast, the procedure of sending a signaling message is the same as that for a data packet. Additionally, the transmission is guaranteed by configuring the HAL such that the transmission status of unicast signaling messages is tracked and those messages can be retransmitted if necessary. The guaranteed unicast explicit signaling messages are also sequence number controlled to provide further robustness in signaling so that redundant signaling messages can be removed in the case where a message is inadvertently retransmitted and successfully delivered twice.

In one embodiment, each signaling message comprises a message identification field, a sequence number field, and a data payload (i.e., content). The message ID field is used to identify the signaling message type, while the sequence number field helps to remove redundant signaling messages. The content of a signaling message advantageously varies for the different types of signaling messages.

A significant advantage of explicit signaling is the guaranteed transmission in the limited period of signaling timeslot. In a wireless network, when channel quality is poor, such a period may not be enough to guarantee the successful reception of a signaling message, even though retransmission is applied. Thus, a single signaling message may be sent across multiple TDMA frames until it is finally received by a destination node. Since the transmit interrupt of the current TDMA frame cannot be kept valid and processed in the next TDMA frame, transmission of new MAC signaling messages are triggered whenever each MAC signaling timeslot starts. Thus, transmission of MAC signaling messages can be driven by either the transmit interrupt (in the same MAC signaling timeslot) or the arrival of a new MAC signaling timeslot.

A timeslot module may be configured to identify one or more timeslots for transmission of packets in accordance with an identified network topology. A channel allocation module may be configured to identify one or more communication channels for transmission of packets in accordance with an identified network topology.

The timeslot and channel allocation module 135 is configured to identify and propagate an optimal timeslot and channel allocation scheme for multichannel TDMA communications. In one embodiment, the timeslot and channel allocation module 135 employs a wave-propagation algorithm that begins at one node in the network and proceeds to each other node in the network until the network topology is determined. Once the various nodal pair links are identified according to the network topology, the links are assigned to non-overlapping channels and then each channel is assigned to a timeslot to maximize throughput during multichannel TDMA communication. In one embodiment, the timeslot and channel allocation module 135 is configured to use explicit signaling to dynamically capture the network topology and resource allocation in a distributed manner.

In one embodiment, the timeslot and channel allocation module 135 operates in two phases, a distributed allocation phase ("DAP") and an allocation adjustment phase ("AAP"). Both phases apply the wave propagation principle, i.e., allocation starts at a first node and proceeds to the last node in the network and then the process is reflected back from the last node to the first node. The wave-propagation path touches each node in the network and allows each node to initiate resource allocation between itself and its neighbor nodes. Nodes that do not reside on the wave-propagation path do not initiate resource allocation but do participate in resource allocation initiated by their neighboring nodes.

In DAP, timeslots and channels are allocated node-by-node as the wave-propagation path is set up. When the wave reaches the last node, it is reflected by traversing the wave-propagation path back to the first node. Once the wave reaches the first node, DAP is complete and AAP starts. In AAP, remaining timeslots and appropriate channels are assigned to nodes one-by-one along the wave-propagation path. Once the wave reaches the last node, it returns back to the initial node along the wave-propagation path. Once all timeslots have been allocated, the dynamic process of timeslot and channel allocation is accomplished and can be repeated.

Figure 5:
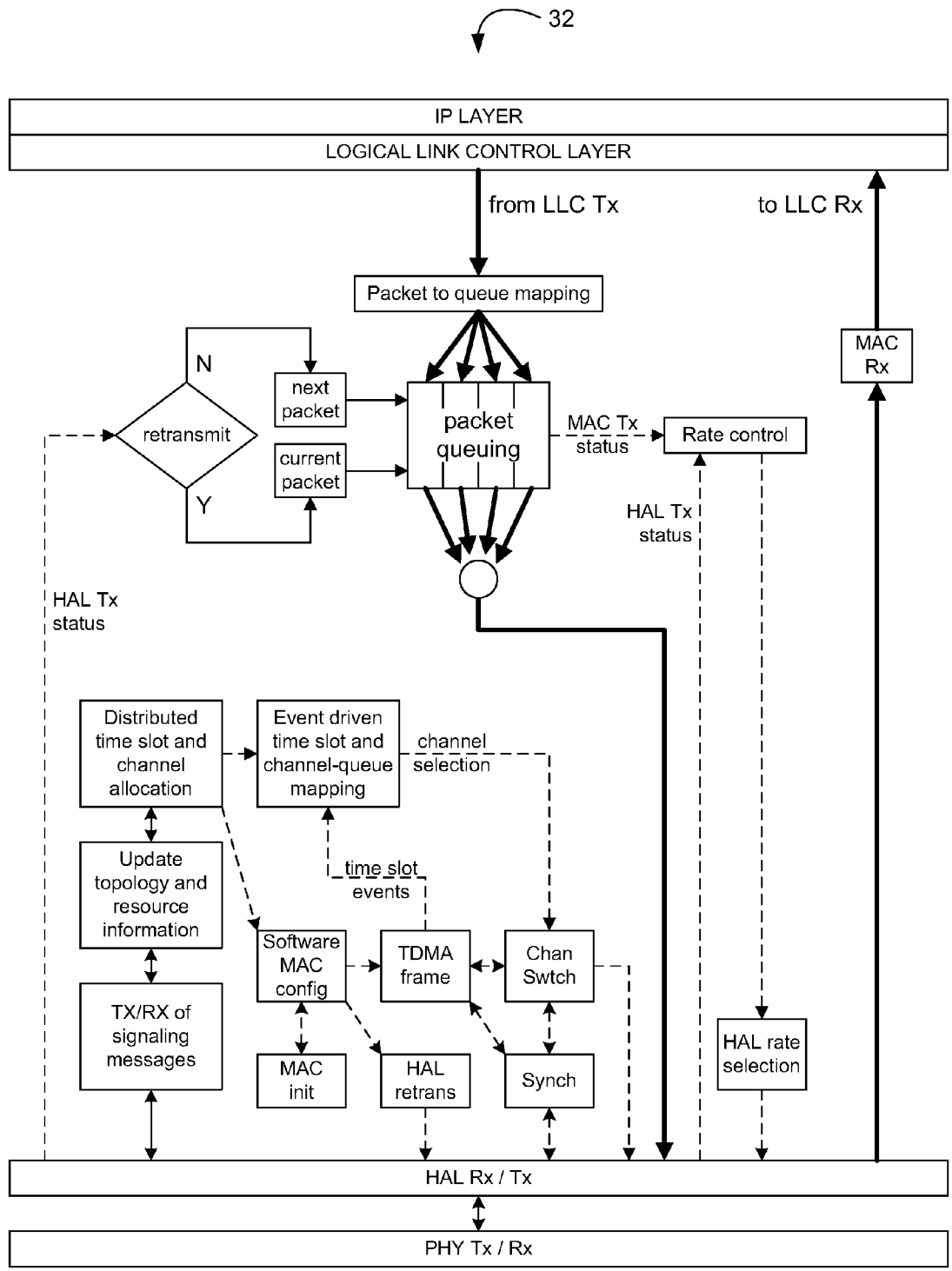
FIG. 5 is a block diagram illustrating an example MAC architecture for distributed multichannel communication according to an embodiment of the present invention.

FIG. 5 is a block diagram illustrating an example MAC architecture on a device 32 configured for distributed multichannel communication according to an embodiment of the present invention. In the illustrated embodiment, the architecture depicts the functions of the device 32 in both the management plane and data plane. In the management plane, a key function is MAC signaling, which is used to send and receive MAC layer signaling messages. Another function that also helps the operation of the device 32 in the management plane is beaconing. Advantageously, standard beaconing defined by IEEE 802.11 can be employed. Because the functions of MAC signaling and beaconing are combined, the network topology and resource allocation are updated dynamically. Based on such real time information, the distributed timeslot and channel allocation scheme is able to determine the most appropriate timeslots and channels for each node.

In the data plane, at the transmitter side data packets from a higher layer, e.g., the LLC layer, are processed and sent according to TDMA with different channels in different timeslots. At the receiver side, bit streams from the physical layer are converted back to a packet in the HAL, and are decoded and processed in the MAC Rx. In order to keep the multichannel operations working without network partition, all time periods except for the regular data slots work on a common channel that is the same for all nodes. Advantageously, the channels for the various regular data slots vary according to the needs of multichannel operation and are accordingly determined by a timeslot and channel allocation algorithm.

Figure 6:
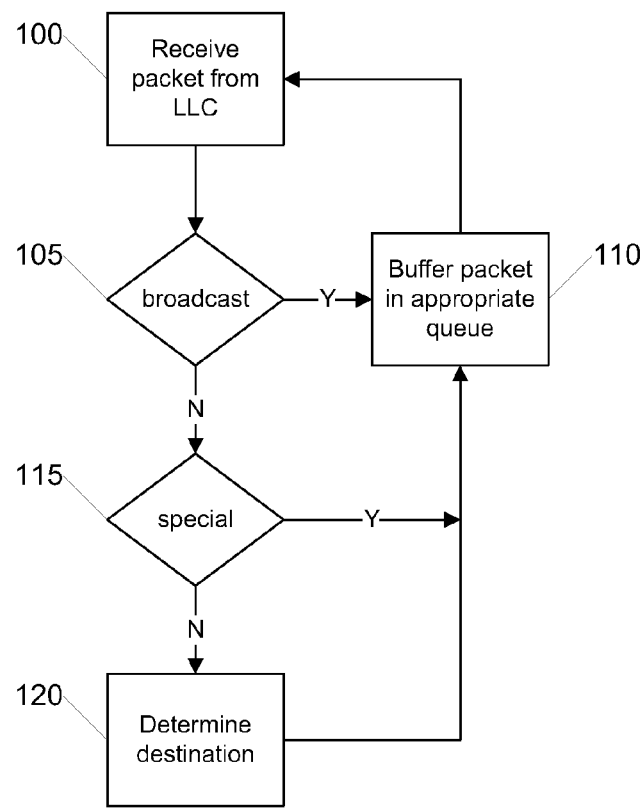
FIG. 6 is a flow diagram illustrating an example process for buffering packets for transmission according to an embodiment of the present invention.

FIG. 6 is a flow diagram illustrating an example process for buffering packets for transmission according to an embodiment of the present invention. This process may be implemented by a node such as that previously described with respect to FIGS. 4-5. Initially, in step 100 the node receives a packet. The packet is examined to determine if it is a broadcast packet in step 105. If it is a broadcast packet, then it is put into the broadcast transmission queue in step 110 for immediate or deferred transmission, depending on the current timeslot and the presence of earlier buffered packets. If not a broadcast packet, then in step 115 the node determines if the packet is a special unicast packet. As previously described, special unicast packets are those packets destined for a node that does not yet have an allocated channel. If the packet is a special unicast packet then it is put into the special unicast transmission queue in step 110 for immediate or deferred transmission, depending on the current timeslot and the presence of earlier buffered packets. If not a broadcast or special unicast packet, then the packet is a regular data packet and in step 120 the MAC header information is examined to determine the destination for the packet and then in step 110 the packet is put into the appropriate transmission queue for immediate or deferred transmission, depending on the current timeslot and the presence of earlier buffered packets.

Figure 7:
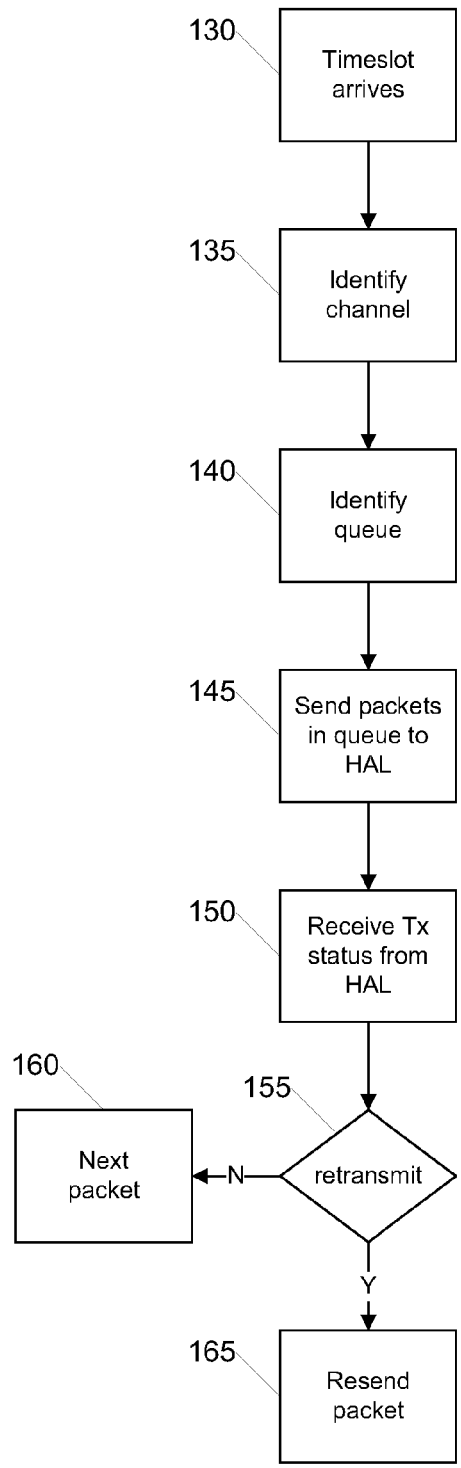
FIG. 7 is a flow diagram illustrating an example process for multichannel packet transmission in a single timeslot according to an embodiment of the present invention.

FIG. 7 is a flow diagram illustrating an example process for multichannel packet transmission in a single timeslot according to an embodiment of the present invention. This process may be implemented by a node such as that previously described with respect to FIGS. 4-5. Initially, in step 130 a new timeslot arrives. The arrival may be indicated by a software beacon alert event as explained below with respect to FIG. 12. Upon the arrival of the timeslot, the node next identifies the channel to be used to send packets, as shown in step 135. In one embodiment, this may be a simple lookup process that examines the results of a timeslot and channel allocation process carried by the node. Next, in step 140 the node identifies the transmission queue from which packets are to be transmitted. This can similarly be a simple lookup of mappings of channels and queues.

In step 145 the node then sends the packets in the queue to the HAL, one by one. In step 155 the node determines if the packet needs to be retransmitted. This determination can be made by examining certain registers maintained by the HAL or by the lack of an acknowledgement of successful transmission from the HAL before a timeout period expires. If the packet does not need to be retransmitted, in step 160 the next packet is obtained from the transmission queue and the process of transmitting new packets continues. If the packet needs to be retransmitted, it is resent in step 165.

Figure 8:
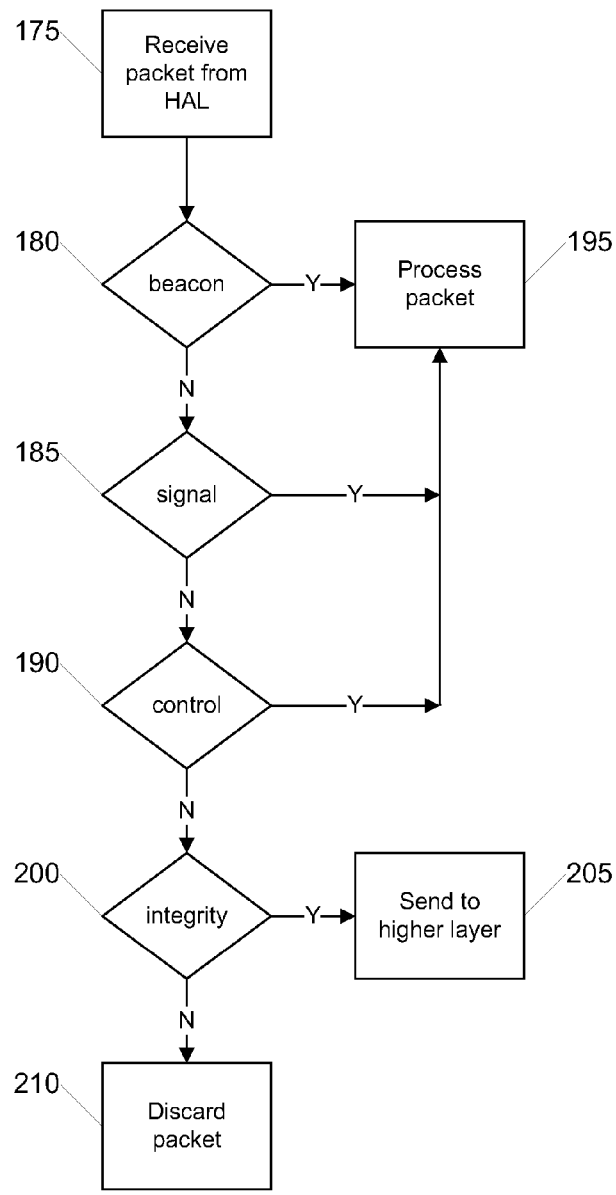
FIG. 8 is a flow diagram illustrating an example process for processing in incoming packets according to an embodiment of the present invention.

FIG. 8 is a flow diagram illustrating an example process for processing in incoming packets according to an embodiment of the present invention. This process may be implemented by a node such as that previously described with respect to FIGS. 4-5. Initially, in step 175 the packet is received. Next, in step 180 the packet is examined to determine if it is a beacon message. If it is not, then in step 185 the packet is examined to determine if it is a signal message. If it is not, then the packet is examined in step 190 to determine if it is a control message. If the examination of the packet in steps 180-190 determines that the packet is a beacon message, a signal message, or a control message, then in step 195 the packet is processed accordingly by the DMT-MAC.

If the packet is not a beacon message, a signal message, or a control message, then it is a data message and the integrity of the packet is determined in step 200. If the packet has been received intact and is authenticated, in step 205 the packet is sent to a higher layer for further processing. If the packet failed the integrity check in step 200 and is therefore not authenticated, it is discarded, as shown in step 210.

Figure 9:
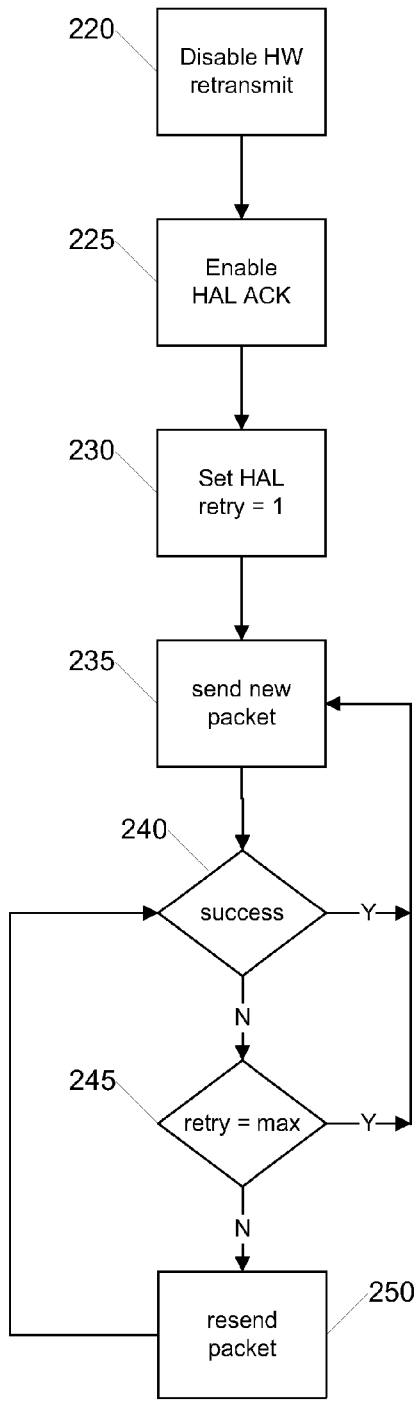
FIG. 9 is a flow diagram illustrating an example process for software retransmission of packets according to an embodiment of the present invention.

FIG. 9 is a flow diagram illustrating an example process for software retransmission of packets according to an embodiment of the present invention. This process may be implemented by a node such as that previously described with respect to FIGS. 4-5. Initially, in step 220 the node disables the hardware retransmit capability in the standard IEEE 802.11 HAL. Next, in step 225 the node configures the HAL to acknowledge when a packet has been successfully transmitted. Then in step 230 the node configures the HAL so that its retry level is set to one. Once the HAL has been configured in steps 220-230, the node sends the new packet in step 235.

After sending the new packet, the node determines in step 240 if the packet was transmitted successfully. This can be accomplished by receiving (or not receiving) and acknowledgment from the HAL of success. This can also be accomplished by examining certain registers maintained by the HAL. If the packet was successfully sent as determined in step 240, then the process loops back to step 235 and a new packet is sent. If the packet was not successfully sent as determined in step 240, then the node checks in step 245 to determine if the maximum number of retries has been met. The maximum number of retries advantageously reflects the number of software retransmission retries and is not related to the number of retries previously configured for the HAL.

If the maximum number of retries have not been met, then the packet is resent in step 250 and the process loops back to step 240 to determine whether the resent packet transmission was successful. If the maximum number of retries has not been met then the process loops back to step 235 where a new packet is sent.

Figures 10, 11:
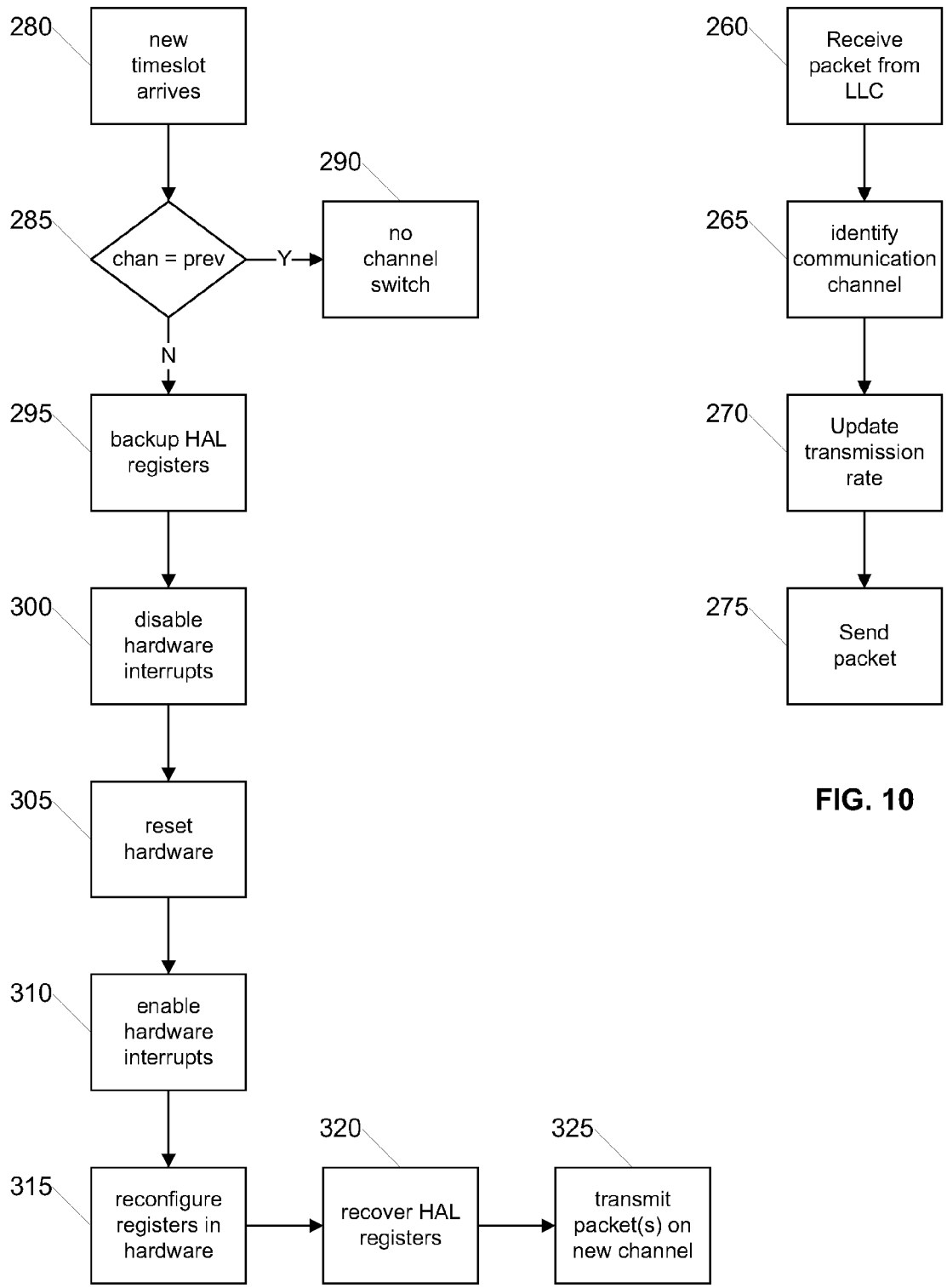
FIG. 10 is a flow diagram illustrating an example process for multichannel transmission rate control according to an embodiment of the present invention.
FIG. 11 is a flow diagram illustrating an example process for fast channel switching according to an embodiment of the present invention.

FIG. 10 is a flow diagram illustrating an example process for multichannel transmission rate control according to an embodiment of the present invention. This process may be implemented by a node such as that previously described with respect to FIGS. 4-5. Initially, in step 260 the node receives a packet for transmission. The packet is next examined in step 265 to identify the appropriate communication channel over which the packet is to be sent. In step 270, the transmission rate for the particular channel is updated based on historical transmission information and then in step 275 the packet is sent. Advantageously, the transmission rate for a given channel may not always be the same. For example, in different timeslots a node may use the same channel for communication with different nodes. Because the signal strength between nodes may vary, the transmission rate may also vary, even though the same channel is used.

FIG. 11 is a flow diagram illustrating an example process for fast channel switching according to an embodiment of the present invention. This process may be implemented by a node such as that previously described with respect to FIGS. 4-5. Initially, in step 280 a new timeslot arrives. Next, in step 285 the channel for communication in the new timeslot is examined to determine if it is the same as the previous channel that was used by the node. If the channel for the new timeslot is the same as the previous channel, then the process ends in step 290 and the node does not switch channels.

If the channel for the new timeslot is not the same as the previous channel, as determined in step 285, then the node proceeds to switch channels. In switching channels, the node first backs up the HAL registers in step 295. For example, certain HAL registers may be important to maintain TDMA communications. Additionally other HAL registers may be ignored. Advantageously, only backing up those registers that are important for continued robust operation can save time in the channel switching process. Next, in step 300 the hardware interrupts are disabled so that the hardware can be reset in step 305. Once the hardware is reset, the hardware interrupts are enabled in step 310 and the HAL registers are reconfigured in step 315 and then restored in step 320 with the backed up information. Finally, in step 325 the packet(s) are transmitted on the new channel.

Figure 12:
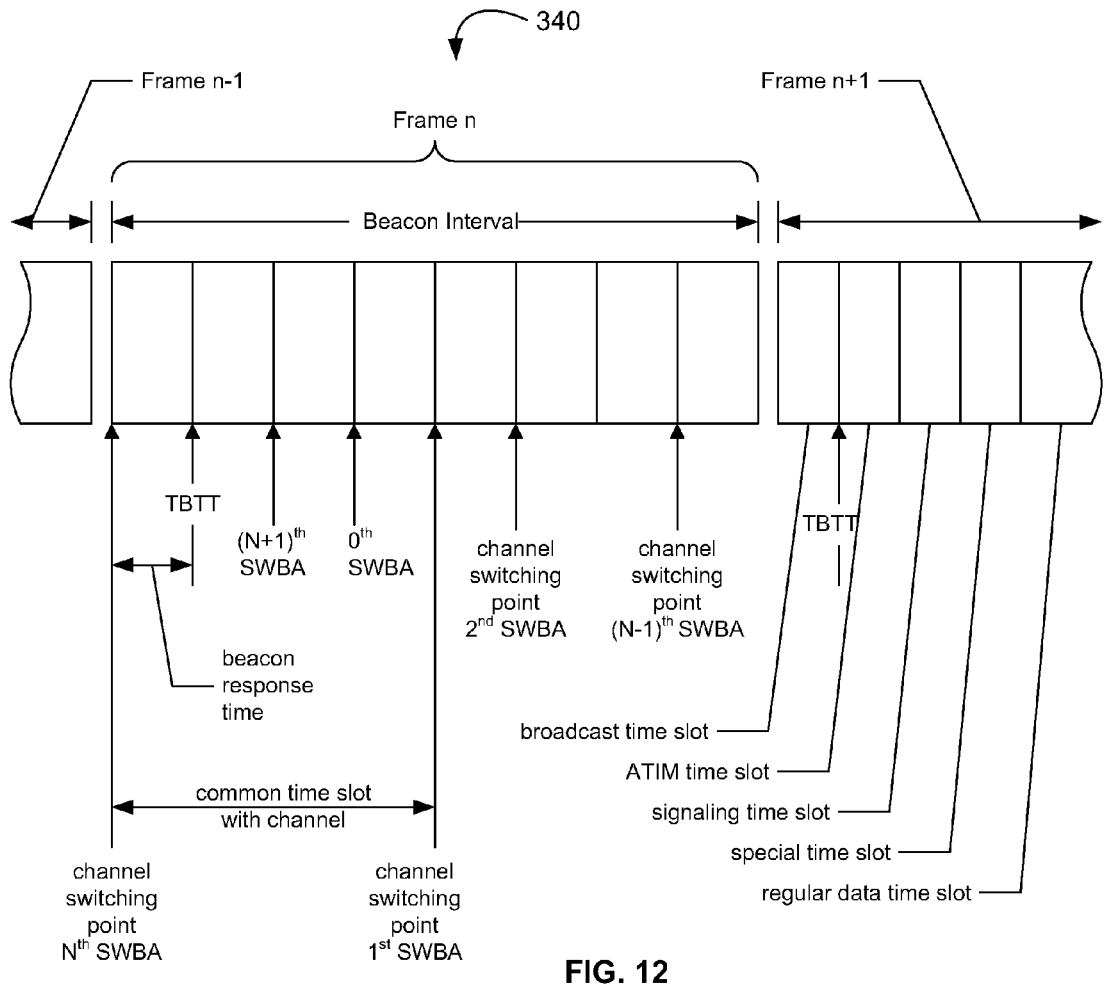
FIG. 12 is a block diagram illustrating an example TDMA frame according to an embodiment of the present invention.

FIG. 12 is a block diagram illustrating an example TDMA frame 340 according to an embodiment of the present invention. In the illustrated embodiment the frame 340 is identified as frame number N and is preceded by a frame number N−1 and followed by a frame number N+1. As will be understood by those having skill in the art, the frames follow each other sequentially. Advantageously, the DMT-MAC works cooperatively with the existing IEEE 802.11 MAC and is configured to control the IEEE 802.11 HAL so that packets do not follow CSMA/CA and that packets are sent according to TDMA in a TDMA frame. In one embodiment, synchronization in a distributed multichannel TDMA communication network is enforced by using the timing synchronization function ("TSF") in the conventional 802.11 MAC.

As shown in the illustrated embodiment, the length of the TDMA frame 340 is equal to a beacon interval and comprises a broadcast transmission common slot during which broadcast messages from higher layers and the MAC layer are sent. The frame 340 also comprises an ad hoc traffic indication message ("ATIM") window during which only ATIM related messages as defined in IEEE 802.11 standard are sent. For example, beacons are sent at the beginning of this period. The frame 340 also comprises a MAC explicit signaling common slot during which MAC layer explicit signaling messages are sent. The frame 340 also comprises a special slot for unicast data transmission during which regular unicast packets are sent when no channel has yet been allocated. Additionally, traffic flows during this period will also help detection of link activities. Without packets being sent during this period, regular data transmission cannot be initiated to activate idle links. The frame 340 also comprises regular slots for unicast data transmission during which regular unicast packets are sent. Because each node may need to send packets to multiple destination nodes, different timeslots are needed for different destinations. Thus, this period can be further divided into multiple timeslots. The number of timeslots is determined dynamically by the timeslot and channel allocation algorithm.

In one embodiment, in order to keep the multichannel communications operational without partitioning the network, all time periods except for the regular slots are implemented over a common channel that is the same for all nodes.

The channels for different regular slots vary according to the needs of multichannel operation and are determined by the timeslot and channel allocation algorithm.

To build the structure of the TDMA frame 340, timing events are generated that indicate the beginning of each period or timeslot. Advantageously, this is accomplished by configuring the HAL to generate a timing event at the beginning of each timeslot. The timing events need to be accurate and therefore cannot be interfered by any other processes. Thus, in one embodiment timing events are generated by hardware. For example, the HAL is configured so that the software beacon alert ("SWBA") timing is controlled for the purpose of generate timing events. In the default IEEE 802.11 MAC chipsets, the SWBA in the HAL was designed to generate a hardware interrupt so that the 802.11 MAC driver knows when a beacon needs to be prepared.

This hardware interrupt mechanism is advantageously modified by configuring the HAL so that the SWBA interrupt arrives at the beginning of each new timeslot. As shown, the beginning of each time period corresponds to the arrival time of SWBA interrupt. Although the SWBA interrupt is controlled to generate timing events of the TDMA frame, it also needs to keep the integrity of beacon generation. Accordingly, the beacon generation events are aligned with the timing events of the TDMA frame. Thus, the target beacon transmission time ("TBTT") event that starts preparation of beacons is aligned with the starting time of ATIM window inside the TDMA frame. Also, the SWBA timing is aligned with the starting time of the broadcast transmission timeslot. And the beacon response time, which is equal to the length of broadcast transmission time, is large enough for beacon related processing to be completed before the TBTT event arrives.

In one embodiment, the DMT-MAC is configured to determine the current time period and/or determine out how much time is left in the current time period by indexing the timing event for each time period. As shown in TDMA frame 340, when the starting point of the special timeslot arrives, the count for time periods is reset to zero. Thus, the regular timeslots are indexed from 1 to N−1, the broadcast timeslot is indexed by N, and the ATIM window is indexed by N+1, with the total number of SWBA events equal to N+2.

Also, the time period can be determined according to the length of each time period and the timing synchronization function. Once a time period is determined, the DMT-MAC can find out how much time of a timeslot has elapsed and how much time in the timeslot still remains.

Figure 13:
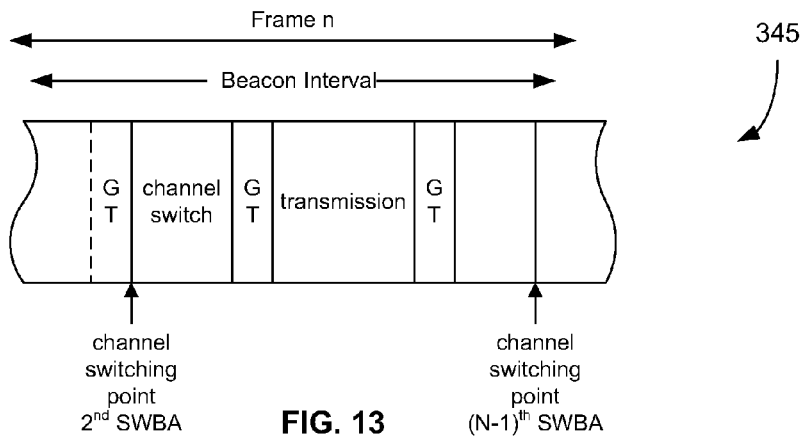
FIG. 13 is a block diagram illustrating an example portion of a TDMA frame according to an embodiment of the present invention.

Turning to FIG. 13 an example portion of a TDMA frame according to an embodiment of the present invention is shown. As shown in the portion of the TDMA frame 345, each timeslot also includes a small period of guard time. Guard time is designed to account for timing shifts that may occur even though synchronization is performed among all nodes. The guard time therefore helps to avoid possible transmission collisions. Guard time is also provided to avoid hardware error due to packet receipt by a node before channel switching is done. This is possible because channel switching does not always end at the same time across all nodes, as described above. Guard time is also provided to avoid the change of a timeslot when a packet is still being transmitted in the hardware and thereby ensure that packet transmission can be completed before the end of a timeslot. For example, when a packet is sent during a timeslot, it takes some time for the hardware to complete the transmission. This time is variable depending on the transmission rate.

Figure 14:
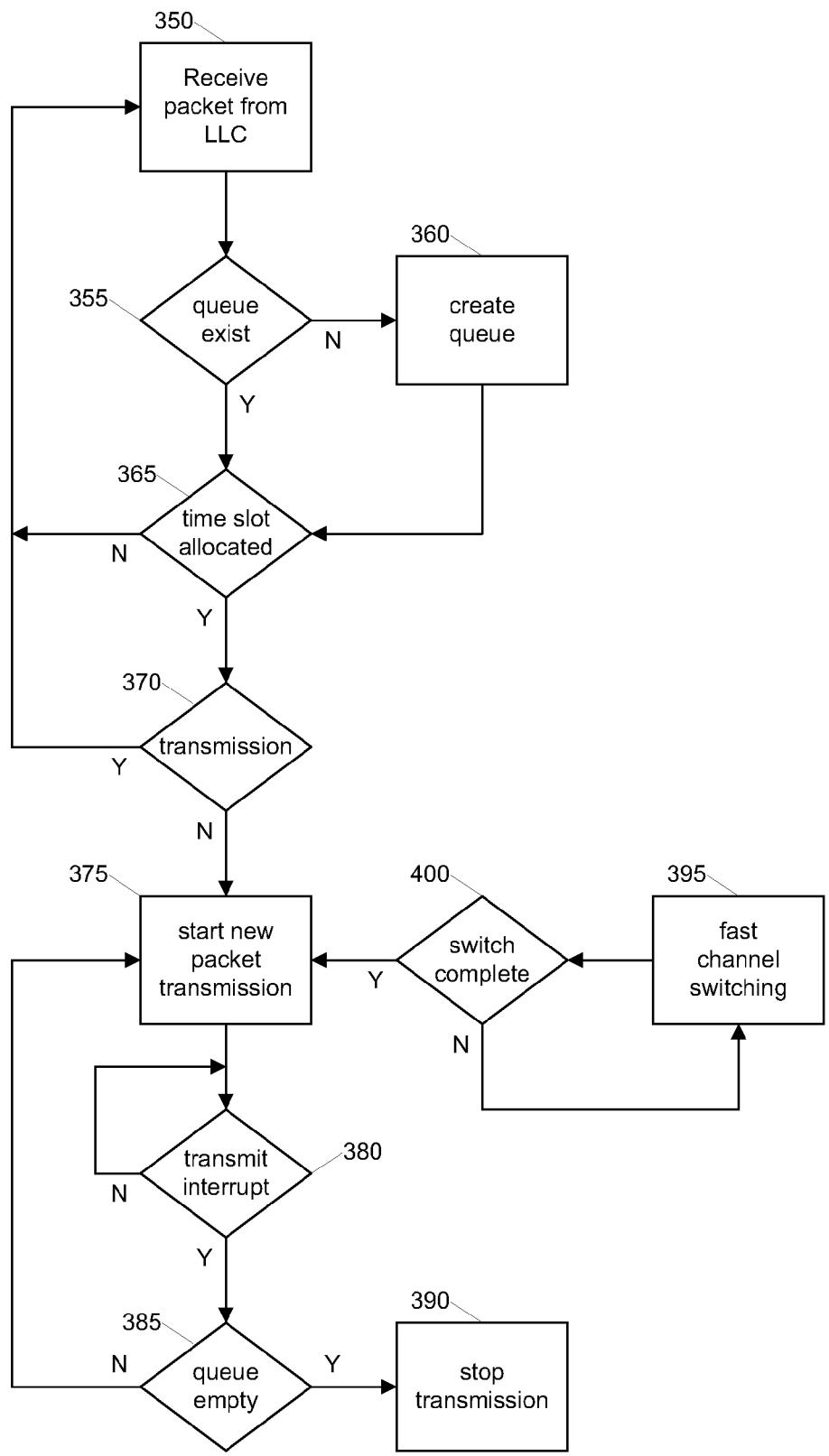
FIG. 14 is a flow diagram illustrating a high level process for distributed multichannel wireless communication according to an embodiment of the present invention.

FIG. 14 is a flow diagram illustrating a high level process for distributed multichannel wireless communication according to an embodiment of the present invention. This process may be implemented by a node such as that previously described with respect to FIGS. 4-5. Initially, in step 350, packets are received. Next, in step 355 the DMT-MAC checks if the queue already exists. If not, in step 360 a new first-in-first-out ("FIFO") queue is created. Otherwise, the packet is stored at the tail of the queue. As shown by steps 365 and 370, the arrival of a new packet does not always trigger an event of packet transmission in the following situations. For example, in step 365 if the queue for the new packet is not assigned to the current timeslot then the new packet will be buffered rather than transmitted. Also, in step 370, if another packet in the same queue as the new packet is still in the process of transmission, then the new packet will be buffered rather than transmitted.

Otherwise stated, the arrival of a new packet triggers a new packet transmission when the current timeslot is assigned to the queue of the new packet and the queue of the new packet does not have packets in the process of being transmitted. Because the packet transmission process for a queue in a timeslot continuously runs unless the queue is empty, this condition is equivalent to the queue being empty before the new packet arrives.

Once the conditions are met, in step 375 the new packet transmission begins and proceeds until complete or until a transmit interrupt is received, as determined in step 380. After an interrupt is received, in step 385 it is determined if the transmit queue is empty and if it is then the transmission stops. If it is not, then the next new packet transmission starts by looping back to step 375. Additionally, at various times during transmission, the transmission channel may be switched by the DMT-MAC, as shown in step 395. If such a case, the channel switching process continues until it is complete as determined in step 400. Once the channel switching process is complete, the DMT-MAC proceeds to step 375 where the start of new packet transmission ensues in order to optimize the avoidance of wasted timeslots.

Figure 15:
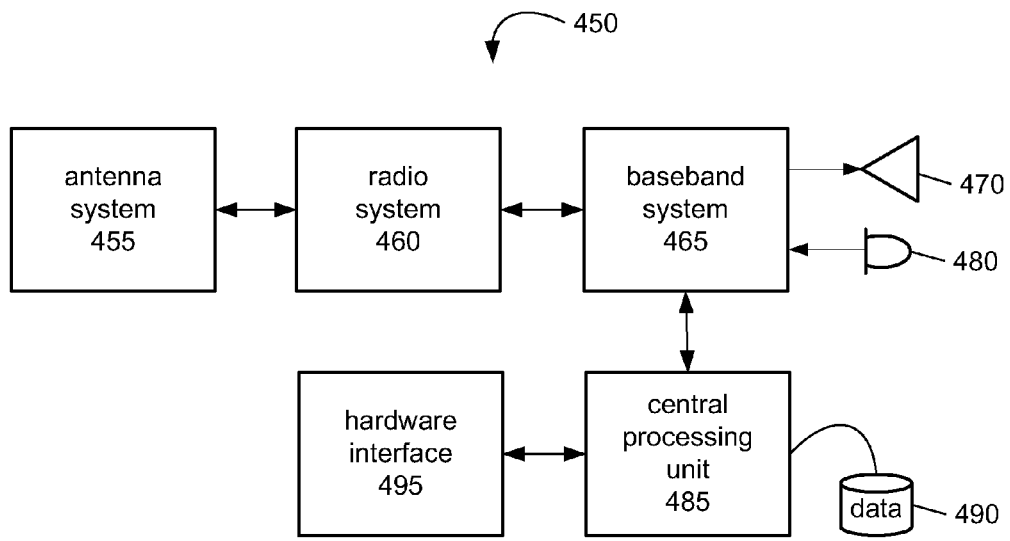
FIG. 15 is a block diagram illustrating an example wireless communication device that may be used in connection with various embodiments described herein.

FIG. 15 is a block diagram illustrating an example wireless communication device 450 that may be used in connection with various embodiments described herein. For example, the wireless communication device 450 may be used in conjunction with a node in a distributed multichannel wireless communication network such as those previously described with respect to FIGS. 1-5. However, other wireless communication devices and/or architectures may also be used, as will be clear to those skilled in the art.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communicate over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIGS. 4 and 5.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 16:
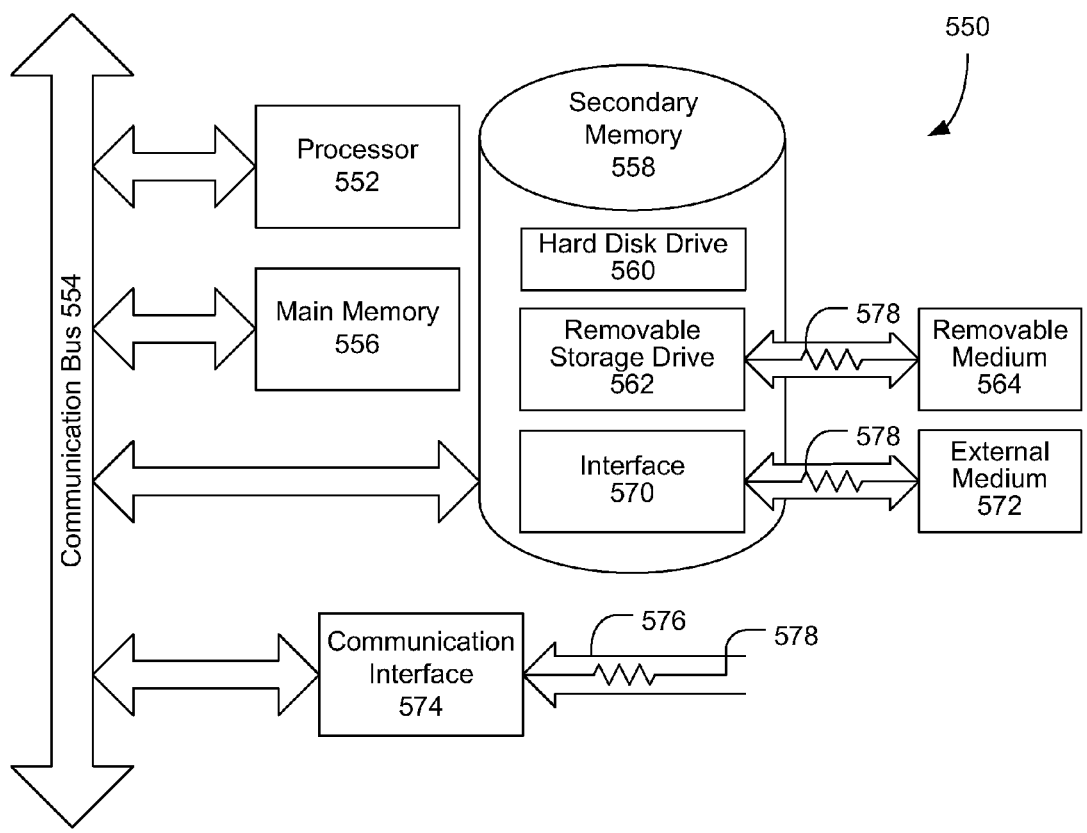
FIG. 16 is a block diagram illustrating an example computer system that may be used in connection with various embodiments described herein.

FIG. 16 is a block diagram illustrating an example computer system 550 that may be used in connection with various embodiments described herein. For example, the computer system 550 may be combined with a wireless communication device such as that described with respect to FIG. 15 to provide a network node or device such as those previously described in FIGS. 1-5. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/ Internet protocol ("TCP/IP"), serial line Internet protocol/ point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A wireless communication device for distributed multichannel time division multiple access communication over a wireless medium in a wireless communication network, comprising:
    a topology module configured to determine a network topology for the wireless communication network;
    a timeslot and channel allocation module configured to (i) dynamically identify and assign a non-overlapping wireless communication channel out of a plurality of available non-overlapping wireless communication channels for transmission of packets over the wireless medium to each neighboring wireless device identified by the topology module and (ii) dynamically identify and assign each non-overlapping wireless communication channel to a timeslot selected out of a plurality of available timeslots for transmission of packets over the wireless medium to each neighboring wireless device identified by the topology module;
    a packet queuing module configured to provide a plurality of first queues, each first queue corresponding to and queuing packets only for a particular one of the non-overlapping wireless communication channels, the packet queuing module further configured to route packets to a proper first queue for transmission to a target neighboring wireless device over the wireless medium based on the non-overlapping wireless communication channel currently assigned to the target neighboring wireless device by the channel allocation module;
    a channel switching module configured to switch wireless communication channels between the plurality of available wireless communication channels in accordance with the non-overlapping wireless communication channel assigned to a current timeslot; and
    a transmit module for transmitting queued packets from respective first queues during corresponding timeslots.

2. The wireless communication device of claim 1, wherein the wireless communication network supports a communication protocol selected from the group consisting of an IEEE 802.11 communication protocol, an IEEE 802.15 communication protocol, and an IEEE 802.16 communication protocol.

3. The wireless communication device of claim 1, wherein the wireless communication network comprises a network selected from the group consisting of an ultra wide band network, a cellular telephone network, and a WiMAX network.

4. The wireless communication device of claim 1, wherein the wireless communication network comprises a network selected from the group consisting of a WiFi network and a ZigBee network.

5. The wireless communication device of claim 1, further comprising a broadcast queue for queuing packets destined for broadcast during a broadcast time period on a common channel.

6. The wireless communication device of claim 1, wherein the plurality of first queues comprise regular data slot queues.

7. The wireless communication device of claim 1, further comprising a special slot data queue for holding packets having a destination that has not yet been assigned a corresponding timeslot or wireless communications channel.

8. The wireless communication device of claim 7, wherein packets from the special slot data queue are sent over a common channel during a special time slot period.

9. The wireless communication device of claim 8, wherein the common channel is a predetermined channel accessible by all devices that are a part of the wireless communication network.

10. The wireless communication device of claim 8, wherein the common channel is a dynamically determined channel that is accessible by all devices that are a part of the wireless communication network, and an identity of the common channel is provided to said all devices that are a part of the wireless network.

11. A method for multichannel time division multiple access (TDMA) communication between a plurality of nodes in a wireless communication network, comprising:
    determining a network topology for the wireless communication network, the network topology identifying a number of neighboring nodes for each node in the wireless communication network, wherein each node and identified neighboring node pair represents a discrete link in the network topology;
    dynamically identifying and assigning a non-overlapping wireless communication channel selected from a plurality of available non-overlapping wireless communication channels to each discrete link in the network topology for transmission of packets between the neighboring nodes in the wireless communication network determined by the network topology;
    dynamically identifying and assigning each non-overlapping wireless communication channel to a timeslot selected out of a plurality of available timeslots for transmission of packets between the neighboring nodes in the wireless communication network determined by the network topology; and
    transmitting packets to one or more of the identified neighboring nodes on the assigned non-overlapping wireless communication channels during respectively assigned timeslots.

12. The method of claim 11, further comprising providing at least one transmission queue at a first node of the plurality of nodes for each non-overlapping wireless communication channel assigned to the discrete links in the wireless communication network.

13. The method of claim 12, further comprising mapping each of the at least one transmission queues to the corresponding non-overlapping wireless communication channel associated with the queue.

14. The method of claim 13, further comprising transmitting packets from the at least one transmission queue during the timeslot assigned to the non-overlapping wireless communication channel associated with the queue in accordance with said mapping.

15. A method for managing transmission rates during multichannel time division multiple access communication over a wireless communication network comprising:
    identifying a plurality of nodes in the wireless communication network and identifying neighboring nodes among the plurality of nodes;
    dynamically identifying and assigning a non-overlapping communication channel out of a plurality of available non-overlapping communication channels for transmission of packets between each pair of said neighboring nodes in the wireless communication network;
    dynamically identifying and assigning each non-overlapping communication channel a time slot selected out of a plurality of available timeslots for transmission of packets between each pair of said neighboring nodes in the wireless communication network;

identifying at a first neighboring node a packet for transmission to a second neighboring node;

determining a communication channel assigned for transmitting packets between the first and second neighboring nodes and a timeslot assigned for transmitting packets between the first and second neighboring nodes on the assigned communication channel;

identifying a transmission rate associated with the communication channel; and transmitting the packet from the first neighboring node to the second neighboring node at the identified transmission rate, on the assigned communication channel, and during the assigned timeslot.

16. A wireless communication device for managing transmission rates during multichannel time division multiple access communication over a wireless communication network comprising:

a topology module configured to identify a plurality of nodes in the wireless communication network and to identify neighboring nodes among the plurality of nodes;

a channel and timeslot allocation module configured to (i) dynamically identify and assign a non-overlapping wireless communication channel out of a plurality of available non-overlapping wireless communication channels for transmission of packets over a wireless medium to each neighboring wireless device identified by the topology module and (ii) dynamically identify and assign each non-overlapping wireless communication channel to a timeslot selected out of a plurality of available timeslots for transmission of packets over the wireless medium to each neighboring wireless device identified by the topology module;

a packet queuing module configured to receive a first packet from a higher layer in a communication stack, identify a first neighboring node destination of the first packet, and to place the first packet in a first queue corresponding to a first non-overlapping wireless communication channel assigned for transmission of packets to the first neighboring node; and a transmit module configured to identify a transmission rate associated with the first non-overlapping wireless communication channel and transmit the queued first packet from the first queue to the first neighboring node destination on the first non-overlapping wireless communication channel during a timeslot assigned to the first non-overlapping wireless communication channel.

17. The device of claim 16, wherein each node and identified neighboring node pair represents a discrete link in the network topology; and wherein the packet queuing module includes at least one transmission queue for each non-overlapping wireless communication channel assigned to the discrete links in the wireless communication network to which the wireless communication device is connected.

18. A computer readable medium having stored thereon, computer executable instructions that, if executed by a device, cause the device to perform a method in a wireless communication network comprising:

determining a network topology for the wireless communication network including identifying neighboring wireless devices;

dynamically identifying and assigning a non-overlapping wireless communication channel out of a plurality of available non-overlapping wireless communication channels for wireless transmission of packets to each identified neighboring wireless device;

dynamically identifying and assigning each non-overlapping wireless communication channel to a timeslot selected out of a plurality of available timeslots for wireless transmission of packets to each identified neighboring wireless device;

routing a packet for wireless transmission to a queue associated with a target neighboring wireless device based on a first non-overlapping wireless communication channel currently assigned to the target neighboring wireless device;

switching a transmitter to the first non-overlapping wireless communication channel upon arrival of a first timeslot assigned to the first non-overlapping wireless communication channel; and wirelessly transmitting the packet from the queue to the target neighboring wireless device.

19. A wireless communication device for distributed multichannel time division multiple access communication over a wireless medium in a wireless communication network, comprising:

means for determining a network topology for the wireless communication network including identifying neighboring wireless devices;

means for dynamically identifying and assigning a non-overlapping wireless communication channel out of a plurality of available non-overlapping wireless communication channels for transmission of packets over the wireless medium to each identified neighboring wireless device;

means for dynamically identifying and assigning each non-overlapping wireless communication channel to a timeslot selected out of a plurality of available timeslots for transmission of packets over the wireless medium to each identified neighboring wireless device;

means for routing a packet for transmission to a queue associated with a target neighboring wireless device over the wireless medium based on a first non-overlapping wireless communication channel currently assigned to the target neighboring wireless device;

means for switching a transmitter to the first non-overlapping wireless communication channel upon arrival of a first timeslot assigned to the first non-overlapping wireless communication channel and for transmitting the packet from the queue to the target neighboring wireless device over the wireless medium during the first timeslot.

20. The device of claim 16, wherein the means for routing includes at least one transmission queue for each non-overlapping wireless communication channel assigned to the discrete links in the wireless communication network to which the wireless communication device is connected.

* * * * *

UNITED STATES PATENT AND TRADEMARK OFFICE
CERTIFICATE OF CORRECTION

| | |
|---|---|
| PATENT NO. | : 7,852,796 B2 |
| APPLICATION NO. | : 11/420668 |
| DATED | : December 14, 2010 |
| INVENTOR(S) | : Wang et al. |

It is certified that error appears in the above-identified patent and that said Letters Patent is hereby corrected as shown below:

Title page, item (56), under "Other Publications", in Column 2, line 1, delete "Zhneyu" and insert -- Zhenyu --.

Signed and Sealed this
Twenty-fourth Day of May, 2011

David J. Kappos
*Director of the United States Patent and Trademark Office*